Figure 1:
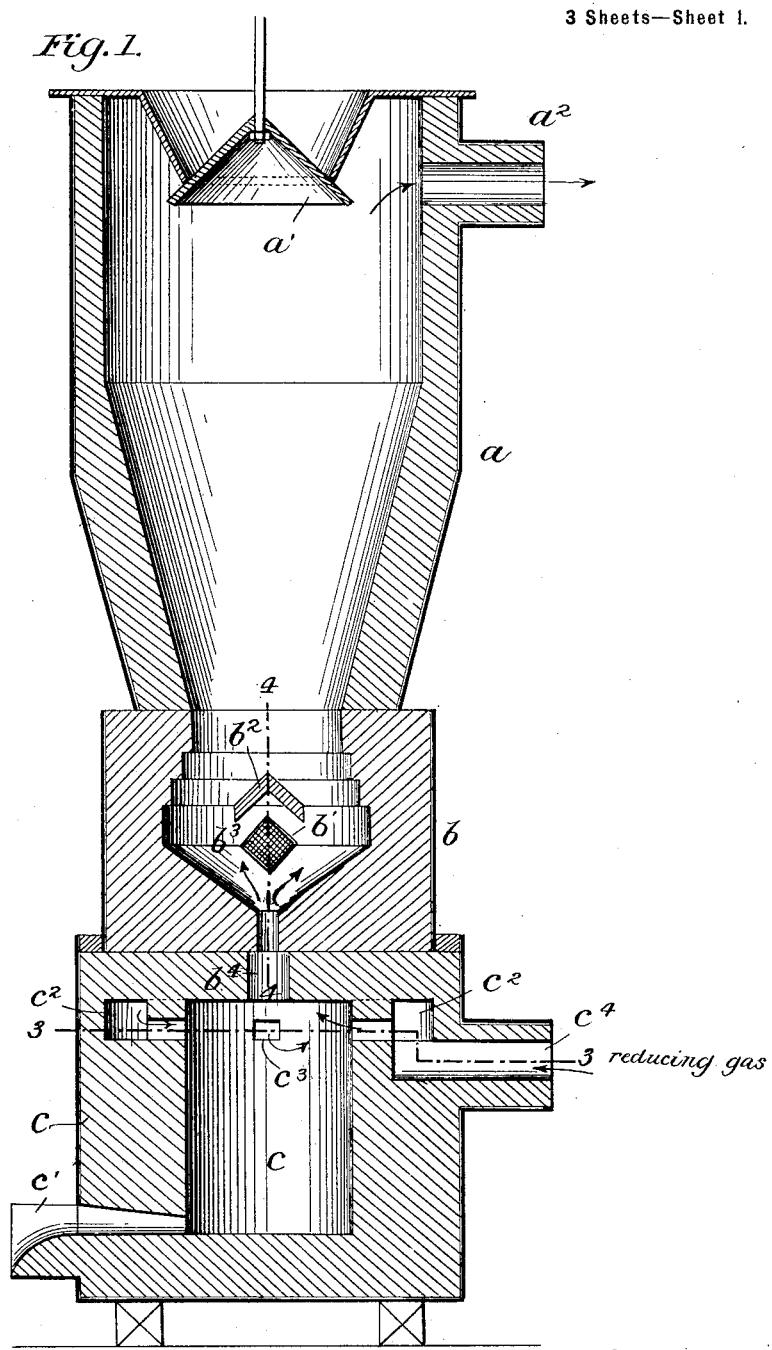

No. 705,651. Patented July 29, 1902.
R. C. CONTARDO.
REDUCTION OF METALS FROM THEIR ORES, &c., IN ELECTRICALLY HEATED FURNACES.
(Application filed Dec. 1, 1897.)
(No Model.) 3 Sheets—Sheet 1.

No. 705,651. Patented July 29, 1902.
R. C. CONTARDO.
REDUCTION OF METALS FROM THEIR ORES, &c., IN ELECTRICALLY HEATED FURNACES.
(Application filed Dec. 1, 1897.)
(No Model.) 3 Sheets—Sheet 2.
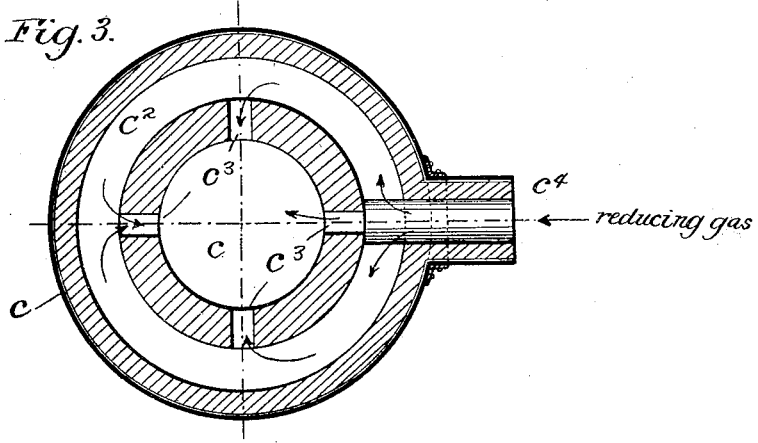
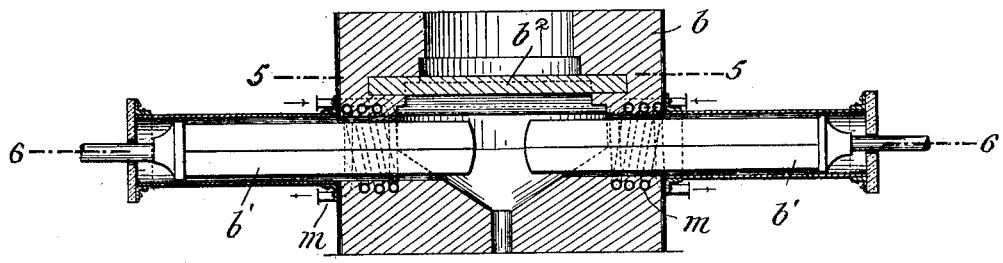
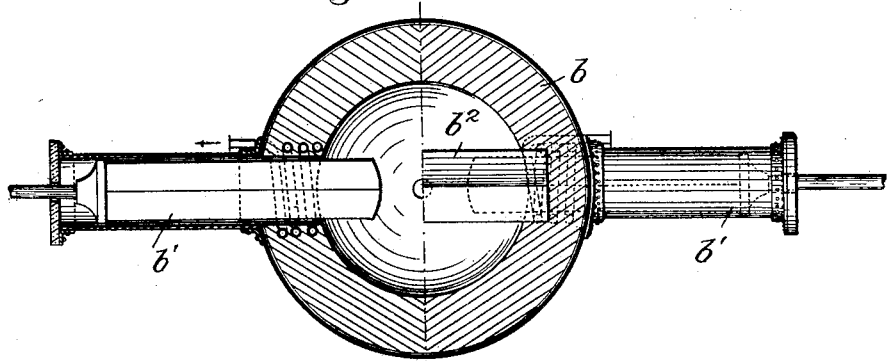
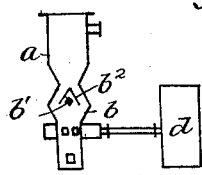

No. 705,651. Patented July 29, 1902.
R. C. CONTARDO.
REDUCTION OF METALS FROM THEIR ORES, &c., IN ELECTRICALLY HEATED FURNACES.
(Application filed Dec. 1, 1897.)
(No Model.) 3 Sheets—Sheet 3.
Fig. 6.
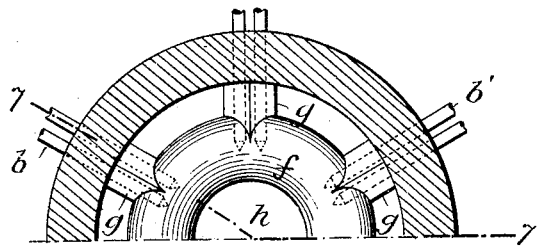
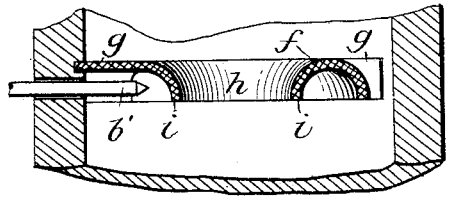
Fig. 7.
Fig. 8.
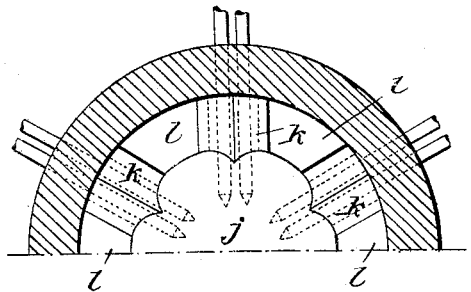
Witnesses: Inventor.

UNITED STATES PATENT OFFICE.

RAMON CHAVARRIA CONTARDO, OF SÈVRES, FRANCE.

REDUCTION OF METALS FROM THEIR ORES, &c., IN ELECTRICALLY-HEATED FURNACES.

SPECIFICATION forming part of Letters Patent No. 705,651, dated July 29, 1902.

Application filed December 1, 1897. Serial No. 660,404. (No specimens.)

*To all whom it may concern:*

Be it known that I, RAMON CHAVARRIA CONTARDO, doctor of laws, a citizen of the Republic of Chile, and a resident of Santiago, Chile, but at present residing at No. 5 Rue de la Plaine Perdue, Sèvres, in the department of Seine, France, have invented new and useful Improvements in the Reduction of Metals from Their Ores and the Like and in Electrically-Heated Furnaces for the Purpose, of which the following is a specification.

My invention relates to a process and apparatus for the production of metals directly from their ores, and more particularly to a process for producing cast-iron or steel of any desired degree of hardness directly from iron ore without the use of solid fuel.

Heretofore ores have been reduced by heating them to the required temperature by an electric current with or without the aid of gases or vapor-producing fluids introduced into the furnace; but in all furnaces of this class the electric current is short-circuited through the mass of ore being treated, so that the ore forms a part of the path or circuit of the current, and the electrodes are projected into the mass. This physical contact of the carbon electrodes with the mass of material being treated renders it impossible to make iron, steel, or cast-iron directly with a given quantity of carbon, for the reason that the metal takes up particles of carbon from the electrodes moving from one pole to the other, the tendency to thus take up the carbon particles depending upon the amount of carbon contained in the metal itself and being greatest when the metal contains the least carbon. Again, the projection of the electrodes into the mass of material does not give the very high temperature required for fusing the ores and pure metal of certain metals of a more refractory character than iron.

A distinguishing characteristic of my invention is that I transform electrical energy into heat by means of the voltaic arc, the voltaic hearth being isolated from and out of physical contact with the material being treated, whereby the heat developed is utilized by radiation and convection and not by conduction, as heretofore. As a result of this method of applying the heat I am enabled to combine with the iron the exact quantity of carbon required for the production of cast-iron or steel by introducing a quantity of hydrocarbon in the form of gas or vapor with the current of reducing-gas supplied to the furnace.

In carrying out my invention the iron ore or the ore of any other metal that can be reduced by hydrogen or carbonic oxid—for the process is a general one—is introduced in lumps of a suitable size into an electric blast-furnace without any solid fuel, but with a suitable flux or solvent of an appropriate nature. Through the bottom of the apparatus, below the electrodes and above the crucible, a current of hydrogen or of carbonic oxid is introduced in a dry state, such gas being obtained from any suitable generator. This current of gas has a double function—first, it reduces the ore raised by the action of the voltaic arc in the furnace to a high temperature, and, second, as it passes over the electrodes it carries away a great amount of heat, which it distributes in a uniformly-decreasing manner in the column or pile of ore, which latter thus stores and utilizes the heat. The whole heat in the interior of the furnace is thus utilized in its entirety if the pile or column of ore has the required volume.

In the particular case where cast-iron or steel is to be produced it is necessary that carbon combine with the iron. This may be attained by introducing into the reducing-gas current an easily-proportionable quantity of a hydrocarbon in the form of gas or vapor. When the operation of the furnace has once been regulated, the appearance of the metal and the test samples taken will show whether it is necessary to increase or diminish the proportion of hydrocarbon. A gas or vapor containing carbon in an easily-dissociable form may of course be employed.

In order to obtain a metal having more or less carbon, I may also, as in the Siemens-Martin process, first melt the iron and subsequently carburize it by adding a highly-carburized alloy obtained by my process or in other ways.

The process forming the subject of this invention thus consists in electrically heating and melting the ore by a voltaic arc isolated from the material being treated and in simultaneously reducing it by means of a current of a suitable gas, (the air being excluded,) and where the object in question is to produce cast-iron or steel the invention further consists in carburizing agents introduced through the medium of the reducing-gas current.

In carrying the process into practice I preferably use a furnace of the kind represented in the accompanying drawings, in which—

Figure 1 is a vertical section of my improved furnace. Fig. 2 is a diagram illustrating a furnace plant complete. Fig. 3 is a horizontal section on the line 3 3 of Fig. 1. Fig. 4 is a vertical section on the line 4 4 of Fig. 1. Fig. 5 represents two sections on different planes, the right-hand half of the figure being a section on the line 5 5 and the left half a section on the line 6 6 of Fig. 4. Fig. 6 is a horizontal section of a modification. Fig. 7 is a vertical section on the line 7 7 of Fig. 6, and Fig. 8 is a horizontal section of another modification.

The electric furnace or electric blast-furnace, which I preferably construct in a cylindrical form, is composed of three principal parts superposed and independent of one another as far as the mounting and construction are concerned—namely, the receiver portion $a$, the electric melting-chamber $b$, and the crucible $c$. The crucible is not, however, essential, and the furnace could be worked without the same. Each of these three parts, generally speaking, forms a chamber the walls of which are made of a refractory substance and covered, if necessary, with a sheet-metal or suitable jacket or mantle. As I have stated, the receiver $a$ and the melting-chamber $b$ are independent of the crucible $c$ and can be successively dismounted for repairing or other purposes. The furnace may be supported on a suitable base in a frame or casing carried by columns. The receiver $a$ is provided with the usual charging apparatus $a'$ and with a gas-outlet $a^2$.

Into the melting, heating, or working chamber $b$ enter the electrodes $b'$. The arrangement, however, of the electrodes or of the voltaic arc or arcs constituting the heating means may vary according as a chamber of large heating-surface or a small chamber of intense heating capacity is required. The electrodes $b'$ may be protected by means of a deflector or shield $b^2$, of a refractory material. This shield or shields prevent the ore from coming into contact with the electrodes. Their shape may vary. In case of a chamber having a single arc it will be sufficient to provide an angular piece covering the electrodes from one point of the furnace to the point diametrically opposite. In the case of a circular intensely-heated chamber (in which the electrodes are arranged like Jablochkoff candles) the roof may be vault-shaped and be arranged in line with the axis of the furnace and be provided with shields connecting the said vault to the sides or walling and covering at the same time the electrodes, while still leaving sufficiently-wide spaces for the passage of the ore.

In Figs. 6, 7, and 8 I have shown two different forms of protector or shield for the electrodes. In Figs. 6 and 7 the protecting-shield consists of a ring or circular plate $f$, secured to the walls of the furnace by radial arms $g$. The plate $f$ is formed with a central opening $h$ and is bent downwardly to form an annular flange $i$, which depends over the ends of the electrodes $b'$. In Fig. 8 the shield consists of a flat imperforate plate $j$, secured to the furnace-walls by radial supporting plates or arms $k$, which extend over the electrodes and leave spaces $l$ for the passage of the metal.

It is obvious that any form of shield which will prevent contact of the electrodes with the metal will serve the purpose, and my invention is not restricted to any specific form of shield or protecting-plate for the electrodes.

The crucible $c$ below the fusion-chamber is provided with a cast or outflow opening $c'$. A passage $c^2$, communicating with the chamber $c$ by passages $c^3$, and consequently with the melting-chamber $b$ and the receiver $a$, serves to convey the current of reducing and carbureting gas into the furnace. The inlet of this passage is in communication through $c^4$ with a gas-generator $d$, Fig. 2, which supplies the furnace with reducing and carbureting gas.

The operation of the furnace will be readily understood. If we suppose the apparatus to be in action—the ore being, for example, supplied automatically, the electric current traversing the electrodes, and the current of reducing (and, as the case may be, carburizing) gas being regularly supplied from the gas-generator—we shall find that in proportion as the ore descends in the receiver and approaches the arc-chamber its temperature rises, and the reduction of the ore gradually takes place down to the fusion-zone $b^3$. The free metal (carburized, if required) flows through the orifice $b^4$ into the crucible or chamber $c$, where it accumulates and whence it is discharged through the cast or outflow opening $c'$. The gases resulting from the reduction escape from the furnace through the orifice $a^2$.

It is evident that without departing from the principle on which this furnace is constructed I may yet in practice employ constructional forms and arrangements which greatly differ from those described in the body of this specification, with reference to the accompanying drawings, according to the particular case and to the special method of carrying my process into practice.

The furnace may or may not be provided with cooling means, such as water circulation around the parts liable to be overheated, as illustrated at $m$ in Fig. 4.

Having now particularly described and ascertained the nature of my said invention and in what manner the same is to be performed, I declare that what I claim is—

1. The process of obtaining metal direct from the ore consisting in subjecting the lower end of a descending column of ore to a high temperature by a voltaic arc not in physical contact with the ore, and simultaneously causing a current of heated reducing-gas to flow upwardly through the column of ore, substantially as set forth.

2. The process herein described of obtaining metal direct from the ore, which consists in subjecting the ore to a high temperature solely by radiation and convection from a voltaic arc, and simultaneously causing a current of reducing-gas containing a carburizing agent to flow through the ore, whereby approximately the exact amount of carbon desired may be combined with the iron.

3. The process herein described of obtaining metal direct from the ore which consists in heating the ore solely by radiation and convection from a voltaic arc, whereby a temperature sufficiently high is obtained to fuse ores more refractory than iron ore, and causing a current of heated reducing-gas to flow upwardly through the ore.

In testimony whereof I have signed my name to this specification in the presence of two subscribing witnesses.

RAMON CHAVARRIA CONTARDO.

Witnesses:
JOHN MILES,
EDWARD P. MACLEAN.